(12) United States Patent
Li

(10) Patent No.: US 10,921,584 B2
(45) Date of Patent: Feb. 16, 2021

(54) METHOD AND DEVICE FOR DISPLAYING IMAGE

(71) Applicant: Beijing Xiaomi Mobile Software Co., Ltd., Beijing (CN)

(72) Inventor: Jinze Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 327 days.

(21) Appl. No.: 15/997,698

(22) Filed: Jun. 5, 2018

(65) Prior Publication Data
US 2019/0101747 A1    Apr. 4, 2019

(30) Foreign Application Priority Data
Sep. 30, 2017 (CN) .......................... 2017 1 0919862

(51) Int. Cl.
G02B 27/00    (2006.01)
G09G 3/32    (2016.01)
(Continued)

(52) U.S. Cl.
CPC ............. G02B 27/005 (2013.01); G09G 3/32 (2013.01); G09G 3/3413 (2013.01);
(Continued)

(58) Field of Classification Search
CPC ...... G02B 27/005; G09G 3/32; G09G 3/3413; G09G 3/36; G09G 2320/048; H04N 9/735
See application file for complete search history.

(56) References Cited

U.S. PATENT DOCUMENTS 10,643,537 B2 *   5/2020   Kwon .................. H01L 27/3206
2013/0241428 A1 * 9/2013   Takeda .................... H05B 45/20
                                                              315/210
(Continued)

FOREIGN PATENT DOCUMENTS

CN    104637464 A    5/2015
CN    105741813 A    7/2016
(Continued)

OTHER PUBLICATIONS

The Extended European Search Report in European application No. 18165602.6, dated Oct. 2, 2018.
(Continued)

*Primary Examiner* — Bryan Bui
(74) *Attorney, Agent, or Firm* — Jun He Law Offices P.C.; James J. Zhu

(57) ABSTRACT

A method for displaying an image includes: acquiring a current total lighting duration of a display device, the current total lighting duration being a current value of a cumulative lighting duration of the display device from a first time the device is lit up; determining a first compensation voltage corresponding to the current total lighting duration of the display device according to a pre-stored corresponding relationship between a total lighting duration and a compensation voltage, the compensation voltage including a compensation sub-voltage corresponding to each color channel of the display device; and adjusting a driving voltage of each pixel of the display device based on the first compensation voltage during display of the image by the display device.

9 Claims, 3 Drawing Sheets

(51) Int. Cl.
*G09G 3/34* (2006.01)
*H04N 9/73* (2006.01)
*G09G 3/36* (2006.01)

(52) U.S. Cl.
CPC ............... *H04N 9/735* (2013.01); *G09G 3/36* (2013.01); *G09G 2320/045* (2013.01); *G09G 2320/046* (2013.01); *G09G 2320/048* (2013.01); *G09G 2320/0666* (2013.01)

(56) References Cited

U.S. PATENT DOCUMENTS

| | | | | |
|---|---|---|---|---|
| 2014/0111560 | A1* | 4/2014 | Yamakawa | ............ G09G 3/006 |
| | | | | 345/690 |
| 2015/0130863 | A1* | 5/2015 | Santo | ................... G09G 3/3413 |
| | | | | 345/691 |
| 2017/0116941 | A1 | 4/2017 | Baek et al. | |
| 2018/0190196 | A1* | 7/2018 | Kwon | ................. H01L 27/3206 |

FOREIGN PATENT DOCUMENTS

| | | |
|---|---|---|
| CN | 105825812 A | 8/2016 |
| CN | 106531083 A | 3/2017 |
| EP | 2874142 A1 | 5/2015 |

OTHER PUBLICATIONS

The First Office Action in Chinese Patent Application No. 201710919862.8, dated Aug. 31, 2020.

\* cited by examiner

METHOD AND DEVICE FOR DISPLAYING IMAGE

CROSS-REFERENCE TO RELATED APPLICATIONS

This application is based upon and claims priority to Chinese Patent Application No. 201710919862.8, filed on Sep. 30, 2017, the entire contents thereof are incorporated herein by reference.

TECHNICAL FIELD

The present disclosure generally relates to the field of electronic technology, and more particularly, to a method and a device for displaying an image.

BACKGROUND

With the development of electronic technology, LED (Light Emitting Diode) is widely used in various fields, such as traffic lights, car lights, street lights, LED displays, LCD screens and the like. An LED is mainly composed of a chip, phosphor and a housing. When the LED is emitting light, the chip emits a blue light, and the phosphor is excited by the blue light to generate a red light and a green light. The lights of the three colors are mixed at different ratios to obtain different colors. The ratio can be controlled by adjusting the amounts and components of the phosphor.

An LCD display utilizes the LED as the backlight to emit light. The backlight passes through a polarizing layer, a liquid crystal layer, a color film layer, etc., to display an image. The light emitted by the LED as the backlight is a white light.

SUMMARY

The inventors found that at least the following problems exist for conventional display devices.

As an LED lighting time of a display device increases, a phosphor of the display device may be aging, leading to a change of a RGB ratio of three primary colors of the display device, and a chromatic aberration in the light emitted by the LED. Therefore, after the LCD panel is used for a long period of time, there will be a chromatic aberration in the light emitted by the LED as backlight, resulting in color distortion of the displayed image.

There are provided a method and a device for displaying an image according to embodiments of the present disclosure. The technical solutions are as follows.

According to a first aspect of the embodiments of the present disclosure, there is provided a method for displaying an image. The method includes:

acquiring a current total lighting duration of a display device, the current total lighting duration being a current value of a cumulative lighting duration of the display device from a first time the device is lit up;

determining a first compensation voltage corresponding to the current total lighting duration of the display device according to a pre-stored corresponding relationship between a total lighting duration and a compensation voltage, the compensation voltage including a compensation sub-voltage corresponding to each color channel of the display device; and adjusting a driving voltage of each pixel of the display device based on the first compensation voltage during display of the image by the display device.

Optionally, determining a first compensation voltage corresponding to the current total lighting duration of the display device according to a pre-stored corresponding relationship between a total lighting duration and a compensation voltage includes:

determining a first chromatic aberration corresponding to the current total lighting duration of the display device according to a pre-stored corresponding relationship between a total lighting duration and a chromatic aberration; and when a difference between the first chromatic aberration and a second chromatic aberration is greater than a preset threshold, determining the first compensation voltage corresponding to the current total lighting duration of the display device according to the pre-stored corresponding relationship between the total lighting duration and the compensation voltage;

wherein the second chromatic aberration is a chromatic aberration corresponding to a second compensation voltage determined when the compensation voltage was determined for a previous time for the display device.

Optionally, the first compensation voltage includes a first compensation sub-voltage corresponding to a red channel, a second compensation sub-voltage corresponding to a green channel, and a third compensation sub-voltage corresponding to a blue channel; and adjusting a driving voltage of each pixel of the display device based on the first compensation voltage during display of the image by the display device includes:

adjusting the driving voltage for red pixels of the display device based on the first compensation sub-voltage, adjusting the driving voltage for green pixels of the display device based on the second compensation sub-voltage, and adjusting the driving voltage for blue pixels of the display device based on the third compensation sub-voltage during display of the image by the display device, Optionally, the step of adjusting the driving voltage for red pixels of the display device based on the first compensation sub-voltage, adjusting the driving voltage for green pixels of the display device based on the second compensation sub-voltage, and adjusting the driving voltage for blue pixels of the display device based on the third compensation sub-voltage during display of the image by the display device includes:

during display of the image by the display device, increasing the driving voltage for the red pixels of the display device by the first compensation sub-voltage, increasing the driving voltage for the green pixels of the display device by the second compensating sub-voltage, and increasing the driving voltage for the blue pixels of the display device by the third compensating sub-voltage; or during display of the image by the display device, decreasing the driving voltage for the red pixels of the display device by the first compensation sub-voltage, decreasing the driving voltage for the green pixels of the display device by the second compensating sub-voltage, and decreasing the driving voltage for the blue pixels of the display device by the third compensating sub-voltage.

Optionally, the method also includes:

acquiring a corresponding relationship between the total lighting duration and the chromatic aberration, and acquiring a corresponding relationship between the chromatic aberration and the compensation voltage; and determining the corresponding relationship between the total lighting duration and the compensation voltage according to the corresponding relationship between the total lighting duration and the chromatic aberration and the corresponding relationship between the chromatic aberration and the compensation voltage, and storing the corresponding relationship between the total lighting duration and the compensation voltage.

Optionally, the corresponding relationship between the total lighting duration and the compensation voltage is a function relationship between the total lighting duration and the compensation voltage.

According to a second aspect of the embodiments of the present disclosure, there is provided a device for displaying an image. The device includes:

an acquiring module configured to acquire a current total lighting duration of a display device, the current total lighting duration being a current value of a cumulative lighting duration of the display device from a first time the device is lit up;

a determining module configured to determine a first compensation voltage corresponding to the current total lighting duration of the display device according to a pre-stored corresponding relationship between a total lighting duration and a compensation voltage, the compensation voltage including a compensation sub-voltage corresponding to each color channel of the display device; and an adjusting module configured to adjust a driving voltage of each pixel of the display device based on the first compensation voltage during display of the image by the display device.

Optionally, the determining module includes:

a first determining sub-module configured to determine a first chromatic aberration corresponding to the current total lighting duration of the display device according to a pre-stored corresponding relationship between a total lighting duration and a chromatic aberration; and a second determining sub-module configured to, when a difference between the first chromatic aberration and a second chromatic aberration is greater than a preset threshold, determine the first compensation voltage corresponding to the current total lighting duration of the display device according to the pre-stored corresponding relationship between the total lighting duration and the compensation voltage;

wherein the second chromatic aberration is a chromatic aberration corresponding to a second compensation voltage determined when the compensation voltage was determined for a previous time for the display device.

Optionally, the first compensation voltage includes a first compensation sub-voltage corresponding to a red channel, a second compensation sub-voltage corresponding to a green channel, and a third compensation sub-voltage corresponding to a blue channel; and the adjusting module is configured to:

during display of the image by the display device, adjust the driving voltage for red pixels of the display device based on the first compensation sub-voltage, adjust the driving voltage for green pixels of the display device based on the second compensation sub-voltage, and adjust the driving voltage for blue pixels of the display device based on the third compensation sub-voltage.

Optionally, the adjusting module is configured to:

during display of the image by the display device, increase the driving voltage for the red pixels of the display device by the first compensation sub-voltage, increase the driving voltage for the green pixels of the display device by the second compensating sub-voltage, and increase the driving voltage for the blue pixels of the display device by the third compensating sub-voltage; or during display of the image by the display device, decrease the driving voltage for the red pixels of the display device by the first compensation sub-voltage, decrease the driving voltage for the green pixels of the display device by the second compensating sub-voltage, and decrease the driving voltage for the blue pixels of the display device by the third compensating sub-voltage.

Optionally, the acquiring module is further configured to: acquire a corresponding relationship between the total lighting duration and the chromatic aberration, and acquire a corresponding relationship between the chromatic aberration and the compensation voltage; and the determining module is further configured to determine the corresponding relationship between the total lighting duration and the compensation voltage according to the corresponding relationship between the total lighting duration and the chromatic aberration and the corresponding relationship between the chromatic aberration and the compensation voltage, and store the corresponding relationship between the total lighting duration and the compensation voltage.

Optionally, the corresponding relationship between the total lighting duration and the compensation voltage is a function relationship between the total lighting duration and the compensation voltage.

According to a third aspect of the embodiments of the present disclosure, there is provided a terminal, comprising: a processor; and a memory for storing at least one instruction, the at least one instruction being loaded and executed by the processor for:

acquiring a current total lighting duration of a display device, the current total lighting duration being a current value of a cumulative lighting duration of the display device from a first time the device is lit up;

determining a first compensation voltage corresponding to the current total lighting duration of the display device according to a pre-stored corresponding relationship between a total lighting duration and a compensation voltage, the compensation voltage comprising a compensation sub-voltage corresponding to each color channel of the display device; and adjusting a driving voltage of each pixel of the display device based on the first compensation voltage during display of the image by the display device.

Optionally, the determining a first compensation voltage corresponding to the current total lighting duration of the display device according to a pre-stored corresponding relationship between a total lighting duration and a compensation voltage comprises:

determining a first chromatic aberration corresponding to the current total lighting duration of the display device according to a pre-stored corresponding relationship between a total lighting duration and a chromatic aberration; and when a difference between the first chromatic aberration and a second chromatic aberration is greater than a preset threshold, determining the first compensation voltage corresponding to the current total lighting duration of the display device according to the pre-stored corresponding relationship between the total lighting duration and the compensation voltage;

wherein the second chromatic aberration is a chromatic aberration corresponding to a second compensation voltage determined when the compensation voltage was determined for a previous time for the display device.

Optionally, the first compensation voltage comprises a first compensation sub-voltage corresponding to a red channel, a second compensation sub-voltage corresponding to a green channel, and a third compensation sub-voltage corresponding to a blue channel; and the adjusting a driving voltage of each pixel of the display device based on the first compensation voltage during display of the image by the display device comprises:

adjusting the driving voltage for red pixels of the display device based on the first compensation sub-voltage, adjusting the driving voltage for green pixels of the display device based on the second compensation sub-voltage, and adjusting the driving voltage for blue pixels of the display device based on the third compensation sub-voltage during display of the image by the display device.

Optionally, the adjusting the driving voltage for red pixels of the display device based on the first compensation sub-voltage, adjusting the driving voltage for green pixels of the display device based on the second compensation sub-voltage, and adjusting the driving voltage for blue pixels of the display device based on the third compensation sub-voltage during display of the image by the display device comprises:

during display of the image by the display device, increasing the driving voltage for the red pixels of the display device by the first compensation sub-voltage, increasing the driving voltage for the green pixels of the display device by the second compensating sub-voltage, and increasing the driving voltage for the blue pixels of the display device by the third compensating sub-voltage; or during display of the image by the display device, decreasing the driving voltage for the red pixels of the display device by the first compensation sub-voltage, decreasing the driving voltage for the green pixels of the display device by the second compensating sub-voltage, and decreasing the driving voltage for the blue pixels of the display device by the third compensating sub-voltage.

Optionally, the at least one instruction being loaded and executed by the processor for:

acquiring a corresponding relationship between the total lighting duration and the chromatic aberration, and acquiring a corresponding relationship between the chromatic aberration and the compensation voltage; and determining the corresponding relationship between the total lighting duration and the compensation voltage according to the corresponding relationship between the total lighting duration and the chromatic aberration and the corresponding relationship between the chromatic aberration and the compensation voltage, and storing the corresponding relationship between the total lighting duration and the compensation voltage.

Optionally, the corresponding relationship between the total lighting duration and the compensation voltage is a function relationship between the total lighting duration and the compensation voltage.

According to a fourth aspect of the embodiments of the present disclosure, there is provided A non-transitory computer-readable storage medium storing at least one instruction, the at least one instruction being loaded and executed by a processor of a terminal to:

acquire a current total lighting duration of a display device, the current total lighting duration being a current value of a cumulative lighting duration of the display device from a first time the device is lit up;

determine a first compensation voltage corresponding to the current total lighting duration of the display device according to a pre-stored corresponding relationship between a total lighting duration and a compensation voltage, the compensation voltage comprising a compensation sub-voltage corresponding to each color channel of the display device; and adjust a driving voltage of each pixel of the display device based on the first compensation voltage during display of the image by the display device.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Through the above-mentioned drawings, explicit embodiments of the present disclosure have been shown and will be described in more detail later. These drawings and textual descriptions are not intended to limit the scope of the inventive concept in any way, but rather to explain one or more of the presently disclosed concepts to those skilled in the art by reference to specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

An exemplary embodiment of the present disclosure provides a method for displaying an image, which is applied to a terminal. The terminal may be a device with a liquid crystal display screen, such as a mobile phone, a computer, or a television.

The terminal may include a processor, a memory, a display device, and etc. The processor, which may be a Central Processing Unit (CPU) or the like, may be configured to determine a compensation voltage corresponding to a current total lighting duration of the display device, according to a pre-stored corresponding relationship between a total lighting duration and a compensation voltage. The total lighting duration is the cumulative lighting duration of the display device from a first time the device is lit up. The memory may be RAM (Random Access Memory), Flash, etc., which may be configured to store received data, data required for processing, data generated during processing, etc., such as the total lighting duration, the compensation voltage, the corresponding relationship between the total lighting duration and the corresponding relationship between the total lighting duration and the chromatic aberration. The display device may be a liquid crystal display, which may be configured to display an image, adjust a driving voltage for each pixel, and the like. The components of the liquid crystal display include a liquid crystal panel, an LED backlight, a driving integrated circuit (IC) and the like.

Figure 1:
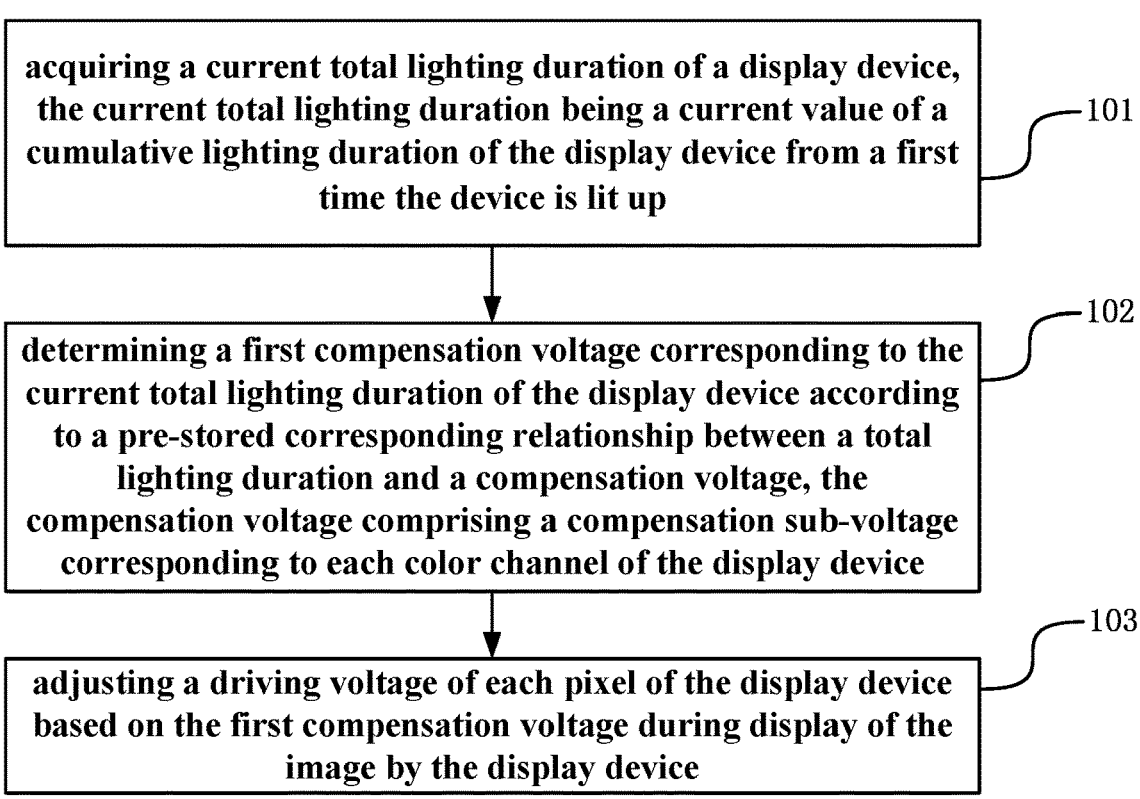
FIG. 1 is a flow chart illustrating a method for displaying an image according to an exemplary embodiment of the present disclosure.

As shown in FIG. 1, a process flow of the method may include the following steps.

In step 101, a current total lighting duration of a display device is acquired.

The current total lighting duration is a current value of a cumulative lighting duration of the display device from the first time the device is lit up.

In an implementation, the display device stores values of the total lighting duration in the memory. When the display device has never been turned on and lit up since the display device is produced, an initial value of the total lighting duration is 0. When the display device is lit up, the display device may start time counting, and the total lighting duration stored in the memory may be updated in real time. When the display device is turned off (e.g., shutdown, put into standby, etc.), the time counting is paused. That is, update of the total lighting duration in the memory is paused. The time counting is not started again until the display device is lit up for the next time.

In the implementation process, the display device may obtain the total lighting duration stored in the memory according to a preset period, and perform subsequent processing. Alternatively, the display device may also acquire the total lighting duration stored in the memory when receiving a compensation voltage update instruction triggered by a user operation, and perform subsequent processing.

In step 102, a first compensation voltage corresponding to the current total lighting duration of the display device is determined according to the pre-stored corresponding relationship between the total lighting duration and the compensation voltage.

The compensation voltage includes a compensation sub-voltage corresponding to each color channel of the display device. For example, for a three-channel RGB display device, the compensation voltage includes a first compensation sub-voltage corresponding to a red channel, a second compensation sub-voltage corresponding to a green channel, and a third compensation sub-voltage corresponding to a blue channel. The corresponding relationship between the total lighting duration and the compensation voltage may be a functional relationship between the total lighting duration and the compensation voltage. Alternatively, the corresponding relationship between the total lighting duration and the compensation voltage may also take a form of a corresponding relationship table. According to the pre-stored corresponding relationship between the total lighting duration and the compensation voltage, when the total lighting duration is determined, the corresponding compensation voltage may also be determined.

In an implementation, the corresponding relationship between the total lighting duration and the compensation voltage may also be stored in the memory of the display device, and the corresponding relationship may be obtained through experiments and calculations by a technician. In the implementation process, the processor reads the current total lighting duration of the display device and the corresponding relationship between the total lighting duration and the compensation voltage from the memory. The corresponding relationship between the total lighting duration and the compensation voltage is a functional relationship between the total lighting duration and the compensation voltage. The current total lighting duration is substituted into the functional relationship to calculate the first compensation voltage corresponding to the total lighting duration. For example, the total lighting duration is 1000 hours. According to the functional relationship between the total lighting duration and the compensation voltage, the first compensation voltage is determined as (0.1V, 0.2V, 0.2V). That is, the first compensation sub-voltage corresponding to the red channel is 0.1V, the second compensation sub-voltage corresponding to the green channel is 0.2V, and the third compensation sub-voltage corresponding to the blue channel is 0.2V.

Optionally, only when the chromatic aberration is significantly changed, the compensation voltage is determined again and used for the adjustment of the driving voltage in the subsequent image display process. The corresponding processing may be as follows: according to the pre-stored corresponding relationship between the total lighting duration and the chromatic aberration, determining a first chromatic aberration corresponding to the current total lighting duration of the display device. If a difference between the first chromatic aberration and a second chromatic aberration is greater than a preset threshold, the first compensation voltage corresponding to the current total lighting duration of the display device is determined according to the pre-stored corresponding relationship between the total lighting duration and the compensation voltage.

The second chromatic aberration is a chromatic aberration corresponding to a second compensation voltage determined when the compensation voltage was determined for a previous time for the display device. The preset threshold may be set by the technician as desired. The preset threshold may be set as the minimum chromatic aberration that can be recognized by human eyes, such that human eyes may recognize a chromatic aberration when the chromatic aberration is greater than the threshold.

In the implementation, an initial value of the chromatic aberration is 0. Then when the display device is initially lit up, the chromatic aberration is 0 (at this time, the chromatic aberration may be regarded as the above second chromatic aberration) and the corresponding compensation voltage (at this time, the compensation voltage may be regarded as the above second compensation voltage) is also 0. Whenever the total lighting duration reaches a preset period time length, the processor substitutes the current total lighting duration into the functional relationship between lighting duration and chromatic aberration to calculate the chromatic aberration corresponding to the total lighting duration (at this time, the chromatic aberration may be regarded as the above first chromatic aberration). When the difference between the first chromatic aberration and the second chromatic aberration is greater than a preset threshold, the display device generates a chromatic aberration recognizable by human eyes for the first time. In this case, the first chromatic aberration is substituted into the functional relationship between the chromatic aberration and the compensation voltage to calculate the compensation voltage corresponding to the first chromatic aberration (at this time, the compensation voltage may be regarded as the first compensation voltage). The compensation voltage is then sent to the display device for adjusting the driving voltage during subsequent image display.

Afterwards, whenever the current total lighting duration reaches a preset period time length, the processor substitutes the current total lighting duration to the functional relationship between the total lighting duration and the chromatic aberration again, and calculates the chromatic aberration corresponding to the total lighting duration (at this time, the chromatic aberration may be regarded as the first chromatic aberration). At this time, it can be considered that the compensation voltage sent to the display device for the previous time is the second compensation voltage, and the chromatic aberration at that time is the second chromatic aberration. When the difference between the first chromatic aberration and the second chromatic aberration is greater than the preset threshold, the display device once again generates a chromatic aberration recognizable by human eyes. At this time, the first chromatic aberration is substituted into the functional relationship between the chromatic aberration and the compensation voltage to calculate the compensation voltage corresponding to the first chromatic aberration (at this time, the compensation voltage may be regarded as the first compensation voltage). The compensation voltage is then sent to the display device for adjusting the driving voltage during subsequent image display.

Optionally, the pre-stored corresponding relationship between the total lighting duration and the compensation voltage is determined according to the corresponding relationship between the total lighting duration and the chromatic aberration and the corresponding relationship between the chromatic aberration and the compensation voltage, and the corresponding processing may be as follows: obtaining the corresponding relationship between the total lighting duration and the chromatic aberration and obtaining the corresponding relationship between the chromatic aberration and the compensation voltage. According to the corresponding relationship between the total lighting duration and the chromatic aberration and the corresponding relationship between the chromatic aberration and the compensation voltage, the corresponding relationship between the total lighting duration and the compensation voltage is determined and stored.

The corresponding relationship between the total lighting duration and the chromatic aberration and the corresponding relationship between the chromatic aberration and the compensation voltage may be functional relationships or may be in the form of corresponding relational tables.

In the implementation, researchers in the laboratory or factory, may detect the chromatic aberration of the display device with a device for detecting chromatic aberration. In an experiment for obtaining the correspondence relationship between the total lighting duration and the chromatic aberration, the LED backlight is continuously turned on and displays a white light. The device for detecting the chromatic aberration starts to periodically detect the chromatic aberration of the display device from the initial lighting of the display device and records the corresponding relationship between the total lighting duration and the chromatic aberration. The experimental data is fitted to obtain the functional relationship between the total lighting duration and the chromatic aberration. In the experiment for obtaining the corresponding relationship between the chromatic aberration and the compensation voltage, the initial chromatic aberration of the LED backlight is 0, and the chromatic aberration of the display device is changed once each time the experiment is performed. In each performance of the experiment, the compensation voltage is adjusted so that the chromatic aberration of the display device is changed. When the chromatic aberration of the display device is 0 or within an error range, the compensation voltage is the required compensation voltage, and the chromatic aberration of the experiment and the corresponding compensation voltage are recorded. All the experimental data of the experiments of the corresponding relationship between the chromatic aberration and the compensation voltage are integrated, to obtain the corresponding relationship between the chromatic aberration and the compensation voltage. The experimental data are fitted to obtain the functional relationship between the chromatic aberration and the compensation voltage. Elimination operation is performed on the chromatic aberration in the functional relationship between the total lighting duration and the chromatic aberration and the corresponding relationship between the chromatic aberration and the compensation voltage to obtain the functional relationship between the total lighting duration and the compensation voltage, and the functional relationship between the total lighting duration and the compensation voltage is stored in the memory of the terminal.

In step 103, the driving voltage of each pixel of the display device is adjusted based on the first compensation voltage during display of the image by the display device.

The first compensation voltage may include a first compensation sub-voltage corresponding to the red channel, a second compensation sub-voltage corresponding to the green channel, and a third compensation sub-voltage corresponding to the blue channel.

In the implementation, the terminal is a device with a liquid crystal display, and the liquid crystal display can drive the pixels of each color by using the driving IC. The processor notifies the driving IC of the first compensation voltage. The driving IC respectively performs a uniform driving voltage adjustment on all pixels corresponding to each color channel of the display device according to the first compensation voltage, with the adjustment value of the driving voltage for all the pixels of the same color channel being the same.

Figure 2:
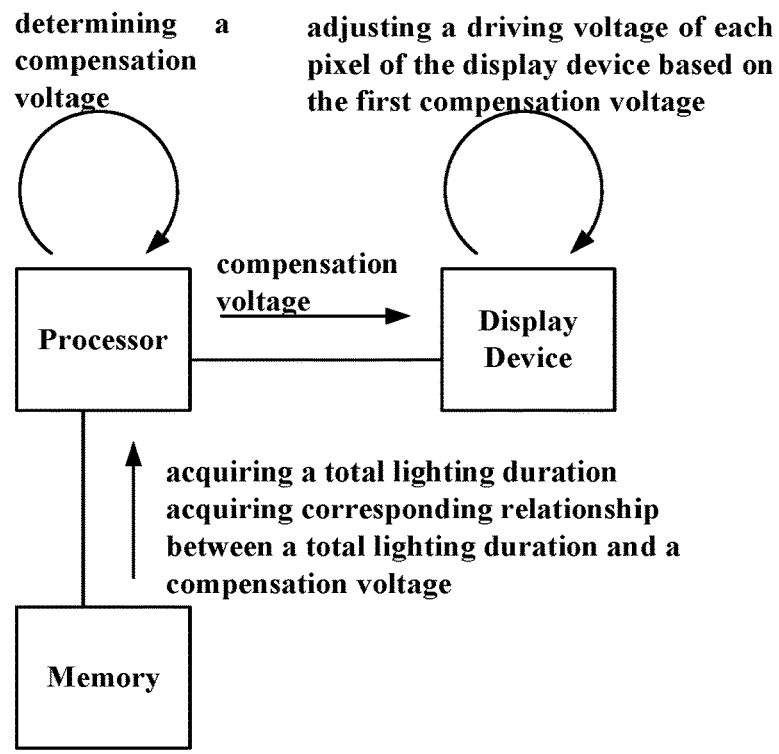
FIG. 2 is a system architecture diagram for the method for displaying an image according to an exemplary embodiment of the present disclosure.

The system architecture of the embodiment of the present disclosure and the execution flow based on the system architecture may be as shown in FIG. 2.

Optionally, the display device may be an RGB three-channel display device. The pixels include red pixels, green pixels, and blue pixels. Correspondingly, the process of adjusting the driving voltage may be as follows. When the display device displays an image, the display device adjusts the driving voltage for the red pixels based on the first compensation sub-voltage, adjusts the driving voltage for the green pixels based on the second compensation sub-voltage, and adjusts the driving voltage for the blue pixels based on the third compensation sub-voltage.

For example, for a three-channel RGB display device, the driving IC determines that the first compensation voltage is (0.1V, 0.2V, 0.2V), that is, the driving voltage for the red pixels is adjusted by 0.1V, the driving voltage for the green pixels is adjusted by 0.2 V, and the driving voltage for the blue pixels is adjusted by 0.2V.

Optionally, adjusting the driving voltage of each pixel may be increasing or decreasing the driving voltage. Corresponding processing may be as follows. When the display device displays an image, the driving voltage for the red pixels is increased by the first compensation sub-voltage, the driving voltage for the green pixels is increased by the second compensating sub-voltage, and the driving voltage for the blue pixels is increased by the third compensating sub-voltage. Alternatively, when the display device displays an image, the driving voltage for the red pixels is decreased by the first compensation sub-voltage, the driving voltage for the green pixels is decreased by the second compensating sub-voltage, and the driving voltage for the blue pixels is decreased by the third compensating sub-voltage.

In the embodiments of the present disclosure, the researchers first obtain the corresponding relationship between the total lighting duration and the chromatic aberration and the corresponding relationship between the chromatic aberration and the compensation voltage in the experiments, and obtain the corresponding relationship between the total lighting duration and the compensation voltage by combining the two groups of corresponding relationships. The terminal stores in advance the correspondence relationship between the total lighting duration and the compensation voltage. When the current total lighting duration of the display device reaches a value of the total lighting duration which may generate chromatic aberration according to the experiments, the processor notifies the compensation sub-voltages respectively corresponding to the color pixels to the driving IC of the display device. The driving IC adjusts the driving voltage of each color pixel based on the compensation sub-voltages, such that the light emitted by each color pixel with chromatic aberration adjusted to 0 or within the error range. In this way, when chromatic aberration is expected to be generated during image display by the display device, the driving voltage of each pixel can be adjusted to compensate the chromatic aberration. Therefore, it can reduce the chromatic aberration generated by the display device and reduce the color distortion of the displayed image.

Figure 3:
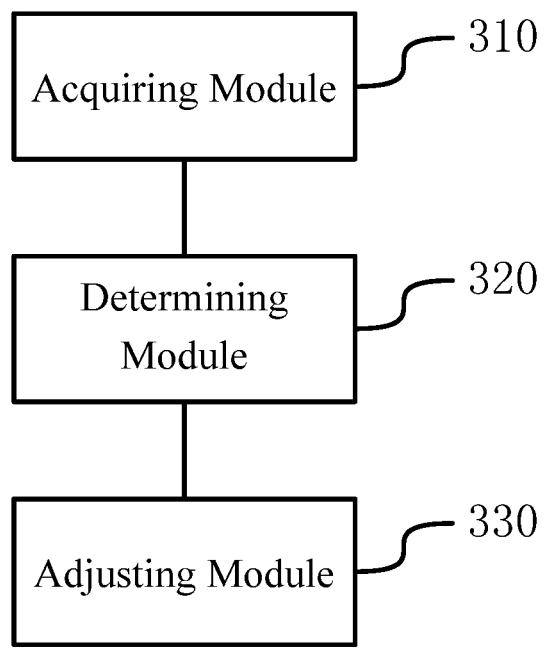
FIG. 3 is a block diagram illustrating a device for displaying an image according to an exemplary embodiment of the present disclosure.

Another exemplary embodiment of the present disclosure provides a device for displaying an image. As shown in FIG. 3, the device includes: an acquiring module 310, a determining module 320 and an adjusting module 330.

The acquiring module 310 is configured to acquire a current total lighting duration of a display device, the current total lighting duration being a current value of a cumulative lighting duration of the display device from a first time the device is lit up.

The determining module 320 is configured to determine a first compensation voltage corresponding to the current total lighting duration of the display device according to a pre-stored corresponding relationship between a total lighting duration and a compensation voltage, the compensation voltage including a compensation sub-voltage corresponding to each color channel of the display device.

The adjusting module 330 is configured to adjust a driving voltage of each pixel of the display device based on the first compensation voltage during display of the image by the display device.

Figure 4:
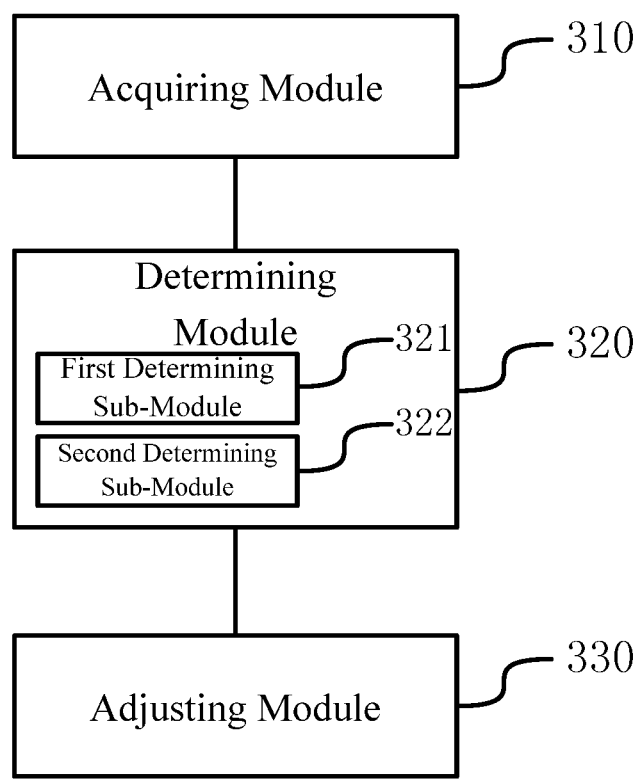
FIG. 4 is a block diagram illustrating a device for displaying an image according to an exemplary embodiment of the present disclosure.

Optionally, as shown in FIG. 4, the determining module 320 includes:

a first determining sub-module 321 configured to determine a first chromatic aberration corresponding to the current total lighting duration of the display device according to a pre-stored corresponding relationship between a total lighting duration and a chromatic aberration; and a second determining sub-module 322 configured to, when a difference between the first chromatic aberration and a second chromatic aberration is greater than a preset threshold, determine the first compensation voltage corresponding to the current total lighting duration of the display device according to the pre-stored corresponding relationship between the total lighting duration and the compensation voltage;

wherein the second chromatic aberration is a chromatic aberration corresponding to a second compensation voltage determined when the compensation voltage was determined for a previous time for the display device.

Optionally, the first compensation voltage includes a first compensation sub-voltage corresponding to a red channel, a second compensation sub-voltage corresponding to a green channel, and a third compensation sub-voltage corresponding to a blue channel; and the adjusting module 330 is configured to:

during display of the image by the display device, adjust the driving voltage for red pixels of the display device based on the first compensation sub-voltage, adjust the driving voltage for green pixels of the display device based on the second compensation sub-voltage, and adjust the driving voltage for blue pixels of the display device based on the third compensation sub-voltage.

Optionally, the adjusting module 330 is configured to:

during display of the image by the display device, increase the driving voltage for the red pixels of the display device by the first compensation sub-voltage, increase the driving voltage for the green pixels of the display device by the second compensating sub-voltage, and increase the driving voltage for the blue pixels of the display device by the third compensating sub-voltage; or during display of the image by the display device, decrease the driving voltage for the red pixels of the display device by the first compensation sub-voltage, decrease the driving voltage for the green pixels of the display device by the second compensating sub-voltage, and decrease the driving voltage for the blue pixels of the display device by the third compensating sub-voltage.

Optionally, the acquiring module 310 is further configured to: acquire a corresponding relationship between the total lighting duration and the chromatic aberration, and acquire a corresponding relationship between the chromatic aberration and the compensation voltage; and the determining module 320 is further configured to determine the corresponding relationship between the total lighting duration and the compensation voltage according to the corresponding relationship between the total lighting duration and the chromatic aberration and the corresponding relationship between the chromatic aberration and the compensation voltage, and store the corresponding relationship between the total lighting duration and the compensation voltage.

Optionally, the corresponding relationship between the total lighting duration and the compensation voltage is a function relationship between the total lighting duration and the compensation voltage.

With respect to the device in the foregoing embodiment, the specific manners in which the respective modules perform operations have been described in detail in the embodiment related to the related method, which will not be elaborated herein.

In the embodiments of the present disclosure, a current total lighting duration of a display device is acquired, the current total lighting duration being a current value of a cumulative lighting duration of the display device from a first time the device is lit up; a target compensation voltage corresponding to the current total lighting duration of the display device is determined according to a pre-stored corresponding relationship between a total lighting duration and a compensation voltage, the compensation voltage including a compensation sub-voltage corresponding to each color channel of the display device; and a driving voltage of each pixel of the display device is adjusted based on the target compensation voltage during display of the image by the display device. The correspondence relationship between the total lighting duration of the display device and the compensation voltage for compensating the chromatic aberration may be established in advance based on experiments. Therefore, based on the current total lighting duration of the display device in practice, the required compensation voltage may be determined. When the image is displayed, the drive voltage is adjusted such that the chromatic aberration of the display device can be compensated to reduce the color distortion of the displayed image.

It should be noted that the device for displaying an image provided in the foregoing embodiments is merely illustrated by dividing the foregoing functional modules in image display. In practical applications, the foregoing functions may be allocated by different functional modules according to requirements. For example, the internal structure of the device is divided into different functional modules to accomplish all or part of the functions described above. In addition, the device for displaying an image provided in the foregoing embodiment and the embodiment of the method for displaying an image belong to the same concept. For a specific implementation process, reference may be made to the method embodiment, and details are not described herein again.

According to yet another exemplary embodiment of the present disclosure, there provides a block diagram of a terminal. The terminal may be mobile phone, a computer, a tablet, and the like.

Figure 5:
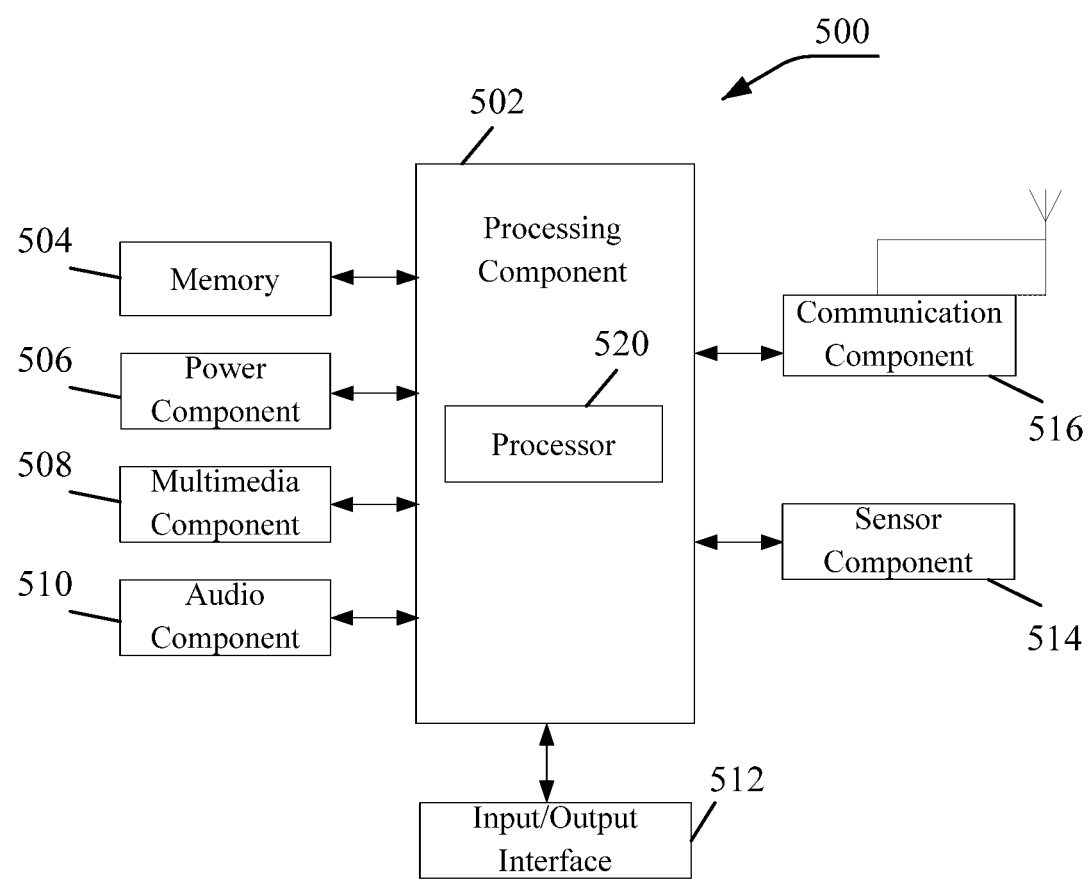
FIG. 5 is a block diagram illustrating a according to an exemplary embodiment of the present disclosure.

Referring to FIG. 5, the terminal 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the terminal 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the terminal 500. Examples of such data include instructions for any applications or methods operated on the device 500, contact data, phonebook data, messages, pictures, video, etc. The memory 504 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the terminal 500. The power component 506 may include a power management system, one or more power sources, and any other components associated with the generation, management, and distribution of power in the terminal 500.

The multimedia component 508 includes a screen providing an output interface between the terminal 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the terminal 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the terminal 500 is in an operation mode, such as a call mode, a recording mode, and a voice recognition mode. The received audio signal may be further stored in the memory 504 or transmitted via the communication component 516.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the terminal 500. For instance, the sensor component 514 may detect an open/closed status of the terminal 500, relative positioning of components, e.g., the display and the keypad, of the terminal 500, a change in position of the terminal 500 or a component of the terminal 500, a presence or absence of user contact with the terminal 500, an orientation or an acceleration/deceleration of the terminal 500, and a change in temperature of the terminal 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate wired or wireless communication, between the terminal 500 and other devices. The terminal 500 can access a wireless network based on a communication standard, such as WiFi, 2Q or 3Q or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 504, executable by the processor 520 in the terminal 500, for performing the above-described methods. For example, the non-transitory computer-readable storage medium may be a ROM, a RAM, a CD-ROM, a magnetic tape, a floppy disc, an optical data storage device, and the like.

Another embodiment of the present disclosure also provides a non-transitory computer-readable storage medium, when instructions in the storage medium are executed by the processor of the terminal, enables the terminal to perform:

acquiring a current total lighting duration of a display device, the current total lighting duration being a current value of a cumulative lighting duration of the display device from a first time the device is lit up;

determining a first compensation voltage corresponding to the current total lighting duration of the display device according to a pre-stored corresponding relationship between a total lighting duration and a compensation voltage, the compensation voltage including a compensation sub-voltage corresponding to each color channel of the display device; and adjusting a driving voltage of each pixel of the display device based on the first compensation voltage during display of the image by the display device.

Optionally, the step of determining a first compensation voltage corresponding to the current total lighting duration of the display device according to a pre-stored corresponding relationship between a total lighting duration and a compensation voltage includes:

determining a first chromatic aberration corresponding to the current total lighting duration of the display device according to a pre-stored corresponding relationship between a total lighting duration and a chromatic aberration; and when a difference between the first chromatic aberration and a second chromatic aberration is greater than a preset threshold, determining the first compensation voltage corresponding to the current total lighting duration of the display device according to the pre-stored corresponding relationship between the total lighting duration and the compensation voltage;

wherein the second chromatic aberration is a chromatic aberration corresponding to a second compensation voltage determined when the compensation voltage was determined for a previous time for the display device.

Optionally, the first compensation voltage includes a first compensation sub-voltage corresponding to a red channel, a second compensation sub-voltage corresponding to a green channel, and a third compensation sub-voltage corresponding to a blue channel; and the step of adjusting a driving voltage of each pixel of the display device based on the first compensation voltage during display of the image by the display device includes:

adjusting the driving voltage for red pixels of the display device based on the first compensation sub-voltage, adjusting the driving voltage for green pixels of the display device based on the second compensation sub-voltage, and adjusting the driving voltage for blue pixels of the display device based on the third compensation sub-voltage during display of the image by the display device.

Optionally, the step of adjusting the driving voltage for red pixels of the display device based on the first compensation sub-voltage, adjusting the driving voltage for green pixels of the display device based on the second compensation sub-voltage, and adjusting the driving voltage for blue pixels of the display device based on the third compensation sub-voltage during display of the image by the display device includes:

during display of the image by the display device, increasing the driving voltage for the red pixels of the display device by the first compensation sub-voltage, increasing the driving voltage for the green pixels of the display device by the second compensating sub-voltage, and increasing the driving voltage for the blue pixels of the display device by the third compensating sub-voltage; or during display of the image by the display device, decreasing the driving voltage for the red pixels of the display device by the first compensation sub-voltage, decreasing the driving voltage for the green pixels of the display device by the second compensating sub-voltage, and decreasing the driving voltage for the blue pixels of the display device by the third compensating sub-voltage.

Optionally, the method also includes:

acquiring a corresponding relationship between the total lighting duration and the chromatic aberration, and acquiring a corresponding relationship between the chromatic aberration and the compensation voltage; and determining the corresponding relationship between the total lighting duration and the compensation voltage according to the corresponding relationship between the total lighting duration and the chromatic aberration and the corresponding relationship between the chromatic aberration and the compensation voltage, and storing the corresponding relationship between the total lighting duration and the compensation voltage.

Optionally, the corresponding relationship between the total lighting duration and the compensation voltage is a function relationship between the total lighting duration and the compensation voltage.

In the embodiments of the present disclosure, a current total lighting duration of a display device is acquired, the current total lighting duration being a current value of a cumulative lighting duration of the display device from a first time the device is lit up; a target compensation voltage corresponding to the current total lighting duration of the display device is determined according to a pre-stored corresponding relationship between a total lighting duration and a compensation voltage, the compensation voltage including a compensation sub-voltage corresponding to each color channel of the display device; and a driving voltage of each pixel is adjusted based on the target compensation voltage during display of the image by the display device. The correspondence relationship between the total lighting duration of the display device and the compensation voltage for compensating the chromatic aberration may be established in advance based on experiments. Therefore, based on the current total lighting duration of the display device in practice, the required compensation voltage may be determined. When the image is displayed, the drive voltage is adjusted such that the chromatic aberration of the display device can be compensated to reduce the color distortion of the displayed image.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for displaying an image, comprising:
acquiring a current total lighting duration of a display device, the current total lighting duration being a current value of a cumulative lighting duration of the display device from a first time the device is lit up;
determining a first compensation voltage corresponding to the current total lighting duration of the display device according to a pre-stored corresponding relationship between a total lighting duration and a compensation voltage, the compensation voltage comprising a compensation sub-voltage corresponding to each color channel of the display device; and
adjusting a driving voltage of each pixel of the display device based on the first compensation voltage during display of the image by the display device;
wherein the step of determining a first compensation voltage corresponding to the current total lighting duration of the display device according to a pre-stored corresponding relationship between a total lighting duration and a compensation voltage comprises:
determining a first chromatic aberration corresponding to the current total lighting duration of the display device according to a pre-stored corresponding relationship between a total lighting duration and a chromatic aberration; and
when a difference between the first chromatic aberration and a second chromatic aberration is greater than a preset threshold, determining the first compensation voltage corresponding to the current total lighting duration of the display device according to the pre-stored corresponding relationship between the total lighting duration and the compensation voltage;
wherein the second chromatic aberration is a chromatic aberration corresponding to a second compensation voltage determined when the compensation voltage was determined for a previous time for the display device;
wherein the first compensation voltage comprises a first compensation sub-voltage corresponding to a red channel, a second compensation sub-voltage corresponding to a green channel, and a third compensation sub-voltage corresponding to a blue channel; and
the step of adjusting a driving voltage of each pixel of the display device based on the first compensation voltage during display of the image by the display device comprises:
adjusting the driving voltage for red pixels of the display device based on the first compensation sub-voltage, adjusting the driving voltage for green pixels of the display device based on the second compensation sub-voltage, and adjusting the driving voltage for blue pixels of the display device based on the third compensation sub-voltage during display of the image by the display device.

2. The method according to claim 1, wherein the step of adjusting the driving voltage for red pixels of the display device based on the first compensation sub-voltage, adjusting the driving voltage for green pixels of the display device based on the second compensation sub-voltage, and adjusting the driving voltage for blue pixels of the display device based on the third compensation sub-voltage during display of the image by the display device comprises:
during display of the image by the display device, increasing the driving voltage for the red pixels of the display device by the first compensation sub-voltage, increasing the driving voltage for the green pixels of the display device by the second compensating sub-voltage, and increasing the driving voltage for the blue pixels of the display device by the third compensating sub-voltage; or
during display of the image by the display device, decreasing the driving voltage for the red pixels of the display device by the first compensation sub-voltage, decreasing the driving voltage for the green pixels of the display device by the second compensating sub-voltage, and decreasing the driving voltage for the blue pixels of the display device by the third compensating sub-voltage.

3. The method according to claim 1, further comprising:
acquiring a corresponding relationship between the total lighting duration and the chromatic aberration, and acquiring a corresponding relationship between the chromatic aberration and the compensation voltage; and
determining the corresponding relationship between the total lighting duration and the compensation voltage according to the corresponding relationship between the total lighting duration and the chromatic aberration and the corresponding relationship between the chromatic aberration and the compensation voltage, and storing the corresponding relationship between the total lighting duration and the compensation voltage.

4. The method according to claim 1, wherein the corresponding relationship between the total lighting duration and the compensation voltage is a function relationship between the total lighting duration and the compensation voltage.

5. A terminal, comprising:
a processor; and
a memory for storing at least one instruction, the at least one instruction being loaded and executed by the processor for:
acquiring a current total lighting duration of a display device, the current total lighting duration being a current value of a cumulative lighting duration of the display device from a first time the device is lit up;
determining a first compensation voltage corresponding to the current total lighting duration of the display device according to a pre-stored corresponding relationship between a total lighting duration and a compensation voltage, the compensation voltage comprising a compensation sub-voltage corresponding to each color channel of the display device; and adjusting a driving voltage of each pixel of the display device based on the first compensation voltage during display of the image by the display device;

wherein the step of determining a first compensation voltage corresponding to the current total lighting duration of the display device according to a pre-stored corresponding relationship between a total lighting duration and a compensation voltage comprises:

determining a first chromatic aberration corresponding to the current total lighting duration of the display device according to a pre-stored corresponding relationship between a total lighting duration and a chromatic aberration; and when a difference between the first chromatic aberration and a second chromatic aberration is greater than a preset threshold, determining the first compensation voltage corresponding to the current total lighting duration of the display device according to the pre-stored corresponding relationship between the total lighting duration and the compensation voltage;

wherein the second chromatic aberration is a chromatic aberration corresponding to a second compensation voltage determined when the compensation voltage was determined for a previous time for the display device;

wherein the first compensation voltage comprises a first compensation sub-voltage corresponding to a red channel, a second compensation sub-voltage corresponding to a green channel, and a third compensation sub-voltage corresponding to a blue channel; and the step of adjusting a driving voltage of each pixel of the display device based on the first compensation voltage during display of the image by the display device comprises:

adjusting the driving voltage for red pixels of the display device based on the first compensation sub-voltage, adjusting the driving voltage for green pixels of the display device based on the second compensation sub-voltage, and adjusting the driving voltage for blue pixels of the display device based on the third compensation sub-voltage during display of the image by the display device.

6. The terminal according to claim 5, wherein the adjusting the driving voltage for red pixels of the display device based on the first compensation sub-voltage, adjusting the driving voltage for green pixels of the display device based on the second compensation sub-voltage, and adjusting the driving voltage for blue pixels of the display device based on the third compensation sub-voltage during display of the image by the display device comprises:

during display of the image by the display device, increasing the driving voltage for the red pixels of the display device by the first compensation sub-voltage, increasing the driving voltage for the green pixels of the display device by the second compensating sub-voltage, and increasing the driving voltage for the blue pixels of the display device by the third compensating sub-voltage; or during display of the image by the display device, decreasing the driving voltage for the red pixels of the display device by the first compensation sub-voltage, decreasing the driving voltage for the green pixels of the display device by the second compensating sub-voltage, and decreasing the driving voltage for the blue pixels of the display device by the third compensating sub-voltage.

7. The terminal according to claim 5, wherein the at least one instruction being loaded and executed by the processor for:

acquiring a corresponding relationship between the total lighting duration and the chromatic aberration, and acquiring a corresponding relationship between the chromatic aberration and the compensation voltage; and determining the corresponding relationship between the total lighting duration and the compensation voltage according to the corresponding relationship between the total lighting duration and the chromatic aberration and the corresponding relationship between the chromatic aberration and the compensation voltage, and storing the corresponding relationship between the total lighting duration and the compensation voltage.

8. The terminal according to claim 5, wherein the corresponding relationship between the total lighting duration and the compensation voltage is a function relationship between the total lighting duration and the compensation voltage.

9. A non-transitory computer-readable storage medium storing at least one instruction, the at least one instruction being loaded and executed by a processor of a terminal to:

acquire a current total lighting duration of a display device, the current total lighting duration being a current value of a cumulative lighting duration of the display device from a first time the device is lit up;

determine a first compensation voltage corresponding to the current total lighting duration of the display device according to a pre-stored corresponding relationship between a total lighting duration and a compensation voltage, the compensation voltage comprising a compensation sub-voltage corresponding to each color channel of the display device; and adjust a driving voltage of each pixel of the display device based on the first compensation voltage during display of the image by the display device;

wherein the step of determining a first compensation voltage corresponding to the current total lighting duration of the display device according to a pre-stored corresponding relationship between a total lighting duration and a compensation voltage comprises:

determining a first chromatic aberration corresponding to the current total lighting duration of the display device according to a pre-stored corresponding relationship between a total lighting duration and a chromatic aberration; and when a difference between the first chromatic aberration and a second chromatic aberration is greater than a preset threshold, determining the first compensation voltage corresponding to the current total lighting duration of the display device according to the pre-stored corresponding relationship between the total lighting duration and the compensation voltage;

wherein the second chromatic aberration is a chromatic aberration corresponding to a second compensation voltage determined when the compensation voltage was determined for a previous time for the display device;

wherein the first compensation voltage comprises a first compensation sub-voltage corresponding to a red channel, a second compensation sub-voltage corresponding to a green channel, and a third compensation sub-voltage corresponding to a blue channel; and the step of adjusting a driving voltage of each pixel of the display device based on the first compensation voltage during display of the image by the display device comprises:

adjusting the driving voltage for red pixels of the display device based on the first compensation sub-voltage, adjusting the driving voltage for green pixels of the display device based on the second compensation sub-voltage, and adjusting the driving voltage for blue pixels of the display device based on the third compensation sub-voltage during display of the image by the display device.

* * * * *